United States Patent [19]
Ross

[11] Patent Number: 5,421,836
[45] Date of Patent: Jun. 6, 1995

[54] ORGANIC CHARCOAL BRIQUET AND METHOD OF MANUFACTURE

[76] Inventor: Benjamin R. Ross, 351 Hickory, San Rafael, Calif. 94903

[21] Appl. No.: 150,871

[22] Filed: Nov. 12, 1993

[51] Int. Cl.6 .............................................. C10L 5/44
[52] U.S. Cl. ...................................... 44/560; 44/541; 44/580; 44/589; 44/598
[58] Field of Search ............... 44/541, 554, 543, 580, 44/589, 598, 605, 560, 563

[56] References Cited

U.S. PATENT DOCUMENTS

| | | | |
|---|---|---|---|
| 2,341,377 | 2/1944 | Hinderer | 44/598 |
| 2,548,379 | 4/1951 | Lammersen | 44/541 |
| 3,328,137 | 6/1967 | Mennen | 44/543 |
| 4,167,398 | 8/1979 | Hughes et al. | 44/559 |
| 4,787,914 | 11/1988 | Crace | 44/559 |
| 5,009,671 | 4/1991 | Franke et al. | 44/598 |

Primary Examiner—Prince Willis, Jr.
Assistant Examiner—Cephia D. Tooner
Attorney, Agent, or Firm—Thomas R. Lampe

[57] ABSTRACT

A method of forming organic charcoal briquets from a mix of quantities of discrete coconut charcoal particles, borax, pulverized limestone, binder starch and water as well as the fuel product produced thereby.

7 Claims, 1 Drawing Sheet

ORGANIC CHARCOAL BRIQUET AND METHOD OF MANUFACTURE

TECHNICAL FIELD

This invention relates to an organic fuel product, more particularly to an organic charcoal briquet. In addition, the invention relates to a method of manufacturing an organic charcoal briquet.

BACKGROUND ART

It is well known to form briquets from charcoal formed from a variety of plant materials, most commonly wood. Prior art briquets often contain potentially harmful constituent materials in addition to the wood or other primary charcoal material such as chemical nitrates, chemical starches and other chemicals. Furthermore, "off" flavors can be imparted to the foods being cooked using such briquets as fuel.

The present invention, by contrast, relates to a charcoal briquet which is 100% organic. The charcoal briquet constructed in accordance with the teachings of the present invention suffers from none of the deficiencies pointed out above with respect to the prior art approaches. A constituent element of the charcoal briquet of the present invention is charcoal formed from coconut shells. While it is known to make charcoal from coconut shells, such charcoal has not found application as a constituent element of charcoal briquets.

DISCLOSURE OF INVENTION

The method of forming organic charcoal briquets of the present invention includes the step of producing a coconut charcoal from coconut shells. The coconut charcoal is then pulverized to produce a quantity of discrete coconut charcoal particles. A quantity of borax drying agent is added to the quantity of discrete coconut charcoal particles as is a quantity of pulverized limestone.

A quantity of binder starch is added to the quantity of discrete coconut charcoal briquets and a quantity of water is added also.

The quantities of discrete coconut charcoal particles, borax, pulverized limestone, binder starch and water are then mixed to form a uniform wet mixture of charcoal particles, borax, pulverized limestone, binder starch and water.

A plurality of briquets are formed from the uniform, wet mixture and the plurality of briquets are dried in an oven.

The product produced by the above-described method is an organic fuel including at least one organic charcoal briquet comprising a molded and dried mixture formed from predetermined quantities of discrete coconut shell charcoal particles, borax, pulverized limestone, binder starch and water.

A plurality of organic charcoal briquets of the above-described type are disposed in a flammable woven container, such as dried woven bamboo or dried coconut leaves. The flammable woven container in a preferred form is a bag having two opposed, tied wick ends.

Other features, advantages, and objects of the present invention will become apparent with reference to the following description and accompanying drawings.

BEST MODE FOR CARRYING OUT THE INVENTION

Figure 1:
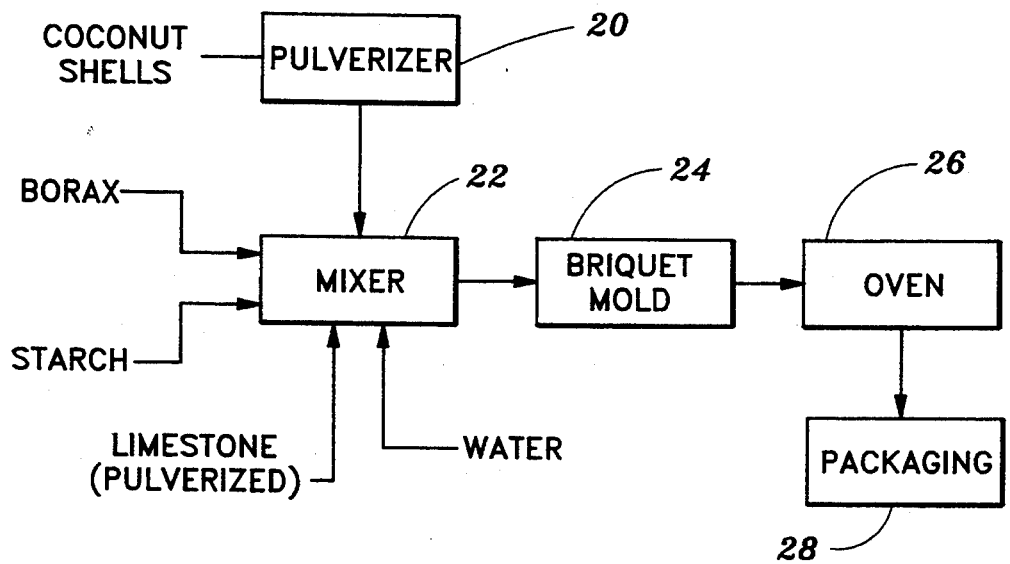
FIG. 1 is a block diagram illustrating steps of the method according to the teachings of the present invention.
Figure 2:
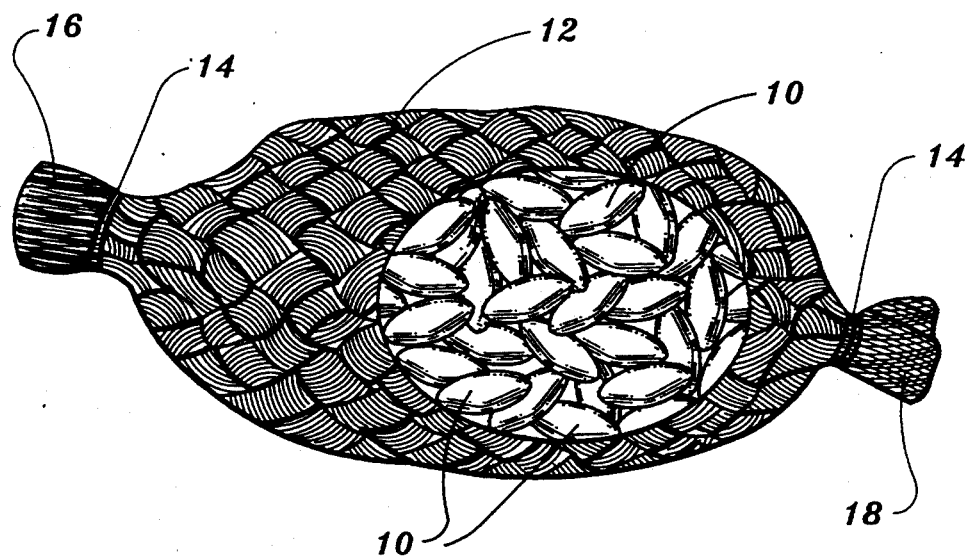
FIG. 2 is a perspective view, partially broken away, illustrating an organic fuel encompassed by the present invention.

Referring now to FIG. 1, a block diagram illustrates the steps of the method of the present invention. The method can be utilized to construct the organic fuel product illustrated in FIG. 2. FIG. 2 discloses a plurality of organic charcoal briquets 10 encapsulated by a flammable woven container in the form of a bag 12. Bag 12 is really in the nature of an open-ended tube having the ends thereof tied off by ties 14. An appropriate material for forming the flammable woven container is either woven bamboo or coconut leaves which are substantially dry. The opposed ends 16, 18 can function as wicks to ignite the package from both ends.

Referring now to FIG. 1, the first step of the present invention comprises producing coconut charcoal from coconut shells with conventional charcoal forming techniques and equipment well known in the prior art for producing charcoal from wood. The coconut charcoal is then pulverized in a pulverizer 20 such as a hammer mill so that the discrete coconut charcoal particles are pulverized to a size which will pass through a number 40 mesh screen. The produced quantity of discrete coconut charcoal particles is then conveyed to a mixing tank or other suitable mixer 22. A number of ingredients, all of an organic nature, are then added to the quantity of discrete coconut charcoal particles.

Borax is one such ingredient and it acts as a cohesive agent or binder to hold the briquet together as it transforms into ash during combustion. The quantity of borax is preferably in the order of 1%, by volume, of the quantity of discrete coconut charcoal particles.

A starch of an organic nature is also added to the mix, a preferred form being powdered cassava. The starch is utilized as a binder in the charcoal briquet. The powdered cassava is formed by slicing cassava into cassava chips, drying the cassava chips, and grinding the dried cassava chips into the cassava powder.

A quantity of pulverized limestone is also added to the mix, said quantity being in the order of 15%, by volume, of the quantity of discrete coconut charcoal particles. The pulverized limestone functions as a charcoal briquet densifier and the quantity thereof is preferably in the order of 18%, by volume, of the quantity of discrete coconut charcoal particles.

A quantity of water is also added to the mix, such quantity being in the order of 40%, by volume, of the quantity of discrete coconut charcoal particles.

The quantities of discrete coconut charcoal particles, borax, pulverized limestone, binder starch and water are then mixed to form a uniform, wet mixture of charcoal particles, borax, pulverized limestone, binder starch and water.

After the mixing step, the uniform, wet mixture or slurry is conveyed to a briquet mold 24 which may be of any suitable conventional construction. The mix or slurry is apportioned to the cavities (not shown) of the mold and compressed to form briquets in a conventional manner.

The briquets are then conveyed to an oven 26 wherein the briquets are dried by heating them to a temperature of at least 100 degrees Centigrade while flowing heating air passed the briquets.

The briquets are then packaged at packaging station 28 in a suitable container such as that shown in FIG. 2.

It will be seen from the above that the fuel produced by the above-described method is of a 100% organic nature. Furthermore, the briquets are clean.

I claim:

1. A method of forming organic charcoal briquets, said method comprising the steps of:
   producing coconut charcoal from coconut shells;
   pulverizing the coconut charcoal to produce a quantity of coconut charcoal particles of a size which will pass through a Number 40 mesh screen;
   adding a quantity of borax cohesive agent to the quantity of coconut charcoal particles, said quantity of borax being about 10 percent, by volume, of the quantity of said coconut charcoal particles;
   adding a quantity of pulverized limestone to the quantity of coconut charcoal particles, said quantity of pulverized limestone being about 15 percent, by volume, of the quantity of said coconut charcoal particles;
   slicing cassava into cassava chips;
   drying the sliced cassava chips;
   grinding the dried cassava chips into cassava powder to form an organic binder starch;
   adding a quantity of said binder starch to the quantity of coconut charcoal particles, said quantity of binder starch being about 6 percent, by volume, of the quantity of said coconut charcoal particles;
   adding a quantity of water to the quantity of coconut charcoal particles, said quantity of water being about 40 percent, by volume, of the quantity of said coconut charcoal particles;
   mixing said quantities of coconut charcoal particles, borax, pulverized limestone, binder starch and water to form a uniform, wet mixture of charcoal particles, borax, pulverized limestone, binder starch and water;
   forming a plurality of organic briquets from said uniform, wet mixture;
   drying the plurality of organic briquets in an oven by heating the briquets to a temperature of at least 100 degrees Centigrade while flowing heated air past the briquets; and
   packaging a plurality of said organic charcoal briquets into a flammable container comprised of woven vegetation.

2. The method according to claim 1 wherein said flammable woven container is a bag having two opposed, tied wick ends.

3. The method according to claim 1 wherein said woven vegetation comprises dried coconut leaves.

4. An organic fuel product including a plurality of organic charcoal briquets, each organic charcoal briquet comprising a molded and dried mixture formed from quantities of coconut shell charcoal particles, borax, pulverized limestone, binder starch and water and produced by carrying out the following method steps:
   producing coconut charcoal from coconut shells;
   pulverizing the coconut charcoal to produce a quantity of coconut charcoal particles of a size which will pass through a Number 40 mesh screen;
   adding a quantity of borax cohesive agent to the quantity of coconut charcoal particles, said quantity of borax being about 10 percent, by volume, of the quantity of said coconut charcoal particles;
   adding a quantity of pulverized limestone to the quantity of coconut charcoal particles, said quantity of pulverized limestone being about 15 percent, by volume, of the quantity of said coconut charcoal particles;
   slicing cassava into cassava chips;
   drying the sliced cassava chips;
   grinding the dried cassava chips into cassava powder to form an organic binder starch;
   adding a quantity of said binder starch to the quantity of coconut charcoal particles, said quantity of binder starch being about 6 percent, by volume, of the quantity of said coconut charcoal particles;
   adding a quantity of water to the quantity of coconut charcoal particles, said quantity of water being about 40 percent, by volume, of the quantity of said coconut charcoal particles;
   mixing said quantities of coconut charcoal particles, borax, pulverized limestone, binder starch and water to form a uniform, wet mixture of charcoal particles, borax, pulverized limestone, binder starch and water;
   forming a plurality of organic briquets from said uniform, wet mixture;
   drying the plurality of organic briquets in an oven by heating the briquets to a temperature of at least 100 degrees Centigrade while flowing heated air past the briquets; and
   packaging said plurality of organic charcoal briquets in a flammable woven container.

5. The organic fuel product according to claim 4 wherein said flammable woven container is formed from dried woven bamboo.

6. The organic fuel product according to claim 4 wherein said flammable woven container is formed from dried coconut leaves.

7. The organic fuel product according to claim 4 wherein said flammable woven container is a bag having two opposed, tied wick ends.

* * * * *